K. S. JOHNSON.
FENCE.
No. 191,240.           Patented May 29, 1877.
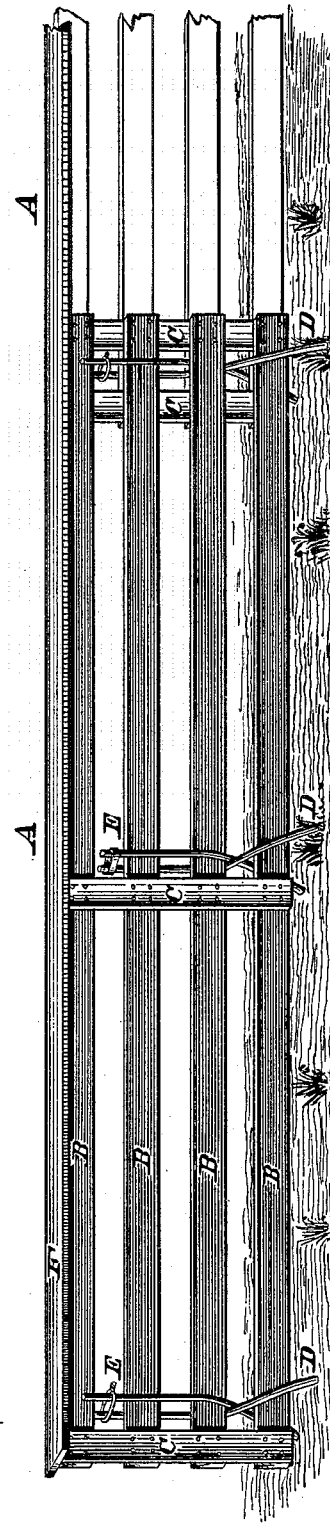
Witnesses:
Frank Hirsch
Chas. Brosart
Inventor:
K. S. Johnson
by Michael J. Stark,
his Atty.

UNITED STATES PATENT OFFICE.

KENDAL S. JOHNSON, OF TOWN LINE, NEW YORK.

IMPROVEMENT IN FENCES.

Specification forming part of Letters Patent No. 191,240, dated May 29, 1877; application filed April 9, 1877.

*To all whom it may concern:*

Be it known that I, KENDAL S. JOHNSON, of Town Line, in the county of Erie and State of New York, have invented certain new and useful Improvements on a Portable Fence; and I do hereby declare that the following description of my said invention, taken in connection with the accompanying sheet of drawings, forms a full, clear, and exact specification, which will enable others skilled in the art to which it appertains to make and use the same.

My invention has special reference to portable fences; and it consists in the arrangement, with a series of panels, constructed of slats, united by transverse pieces, of a series of wrought-iron rods, arranged in pairs, bent so as to transverse one another between two adjacent slats, their lower end being driven into the ground diagonally on each side of the fence, and their upper ends securely tied, whereby the said panels are securely retained in position, and carried upon the intersecting portions of the said rods, in a manner as hereinafter fully described.

In the drawings, which form a part of this specification, and serve to illustrate my invention more fully, the figure is a perspective view of a fence embodying my improvements.

A A are a series of fence-panels, each composed of a suitable number of longitudinal slats, B, secured to vertical slats C, in the middle and on both ends thereof. These panels are preferably made in lengths of from ten to twenty feet, and of either three, four, or more longitudinal slats, according to the height of fence desired, the slats being placed a distance apart to suit the circumstances. These panels A are kept in position by means of wrought-iron posts D, arranged in pairs, one on each side of the panels and one in their middle. Each of these posts consists of two rods, each about half an inch or more in diameter, the upper member being rectilinear, and the lower ends of a pair of rods arranged to transverse one another between two adjacent horizontal slats, the upper ends being tightly secured together by means of wires E.

The lower ends of the rods D are driven into the ground diagonally on each side of the fence, above the lower rail, the proper depth, some distance from the panels, whereby they act as side braces for said panels, which are carried by the rods upon the intersecting portions thereof.

In this manner a cheap portable fence is readily constructed by any one having skill enough to handle a saw and a hammer, which can be put up or removed in a very short space of time, and when properly made is very strong and durable.

To remove any one of the panels for obtaining egress from the inclosure, or for whatever purpose, it is simply necessary to pull up the respective rods in the desired panel, which can be readily done in a few moments, and as readily replaced.

Such an arrangement is very often desirable during the harvest season, and greatly facilitates the harvesting of a crop, by enabling teams, &c., to enter the field on any desired place.

This fence is, furthermore, well adapted for railroad purposes.

It will be readily observed that this fence is particularly adapted to be used in moist soil, since no wooden posts are used, which readily rot, and render frequent repairs necessary.

Instead of tying the rods together, ferrules may be used for the purpose; but in that case the rods should not reach over a horizontal slat, so as to enable the ferrules being put upon the rods.

I claim—

A fence composed of panels, each consisting of horizontal slats and vertical end and middle pieces, retained in position by pairs of rods, bent to transverse one another between two adjacent horizontal slats, whereby the said panels are carried upon the intersecting portions of said rods, as hereinbefore set forth and described.

In testimony that I claim the foregoing as my invention I have hereto set my hand and affixed my seal in the presence of two subscribing witnesses.

KENDAL S. JOHNSON. [L. S.]

Attest:
MICHAEL J. STARK,
FRANK HIRSCH.